United States Patent
Mesnil et al.

(10) Patent No.: US 12,084,098 B2
(45) Date of Patent: Sep. 10, 2024

(54) INSPECTION OF RAIL HEALTH

(71) Applicants: COMMISSARIAT A L'ENERGIE ATOMIQUE ET AUX ENERGIES ALTERNATIVES, Paris (FR); ALSTOM TRANSPORT TECHNOLOGIES, Saint-Ouen (FR)

(72) Inventors: Olivier Mesnil, Gif sur Yvette (FR); Bastien Chapuis, Viroflay (FR); Tom Druet, Le Kremlin Bicêtre (FR)

(73) Assignees: COMMISSARIAT A L'ENERGIE ATOMIQUE ET AUX ENERGIES ALTERNATIVES, Paris (FR); ALSTOM TRANSPORT TECHNOLOGIES, Saint-Ouen (FR)

( * ) Notice: Subject to any disclaimer, the term of this patent is extended or adjusted under 35 U.S.C. 154(b) by 894 days.

(21) Appl. No.: 17/264,674

(22) PCT Filed: Jul. 23, 2019

(86) PCT No.: PCT/EP2019/069777
§ 371 (c)(1),
(2) Date: Jan. 29, 2021

(87) PCT Pub. No.: WO2020/025390
PCT Pub. Date: Feb. 6, 2020

(65) Prior Publication Data
US 2022/0135094 A1 May 5, 2022

(30) Foreign Application Priority Data
Aug. 1, 2018 (FR) .................................... 1857202

(51) Int. Cl.
*B61L 23/04* (2006.01)
*B61L 23/14* (2006.01)
(Continued)

(52) U.S. Cl.
CPC ........... *B61L 23/044* (2013.01); *B61L 23/045* (2013.01); *B61L 23/14* (2013.01); *G01N 29/043* (2013.01);
(Continued)

(58) Field of Classification Search
CPC ...... B61L 23/044; B61L 23/045; B61L 23/14; G01N 29/043; G01N 29/11; G01N 29/4463; G01N 2291/103; G01N 2291/2623
See application file for complete search history.

(56) References Cited

U.S. PATENT DOCUMENTS
9,797,869 B2   10/2017   Loveday

FOREIGN PATENT DOCUMENTS
FR   3 060 743 A1   6/2018
FR   3 073 289 A1   5/2019
WO   WO-2018106677 A1 *   6/2018   ............. G01N 29/04

OTHER PUBLICATIONS

Sadoudi, et al., "Study and development of a communication platform for wireless acoustic sensor networks: application to inspecting the health of rails by ambient noise correlation", Université de Valenciennes et du Hainaut-Cambresis, 2016.
(Continued)

*Primary Examiner* — Robert J McCarry, Jr.
(74) *Attorney, Agent, or Firm* — BakerHostetler (57) ABSTRACT

A method and system for inspecting a rail by guided waves, the rail being instrumented by sensors. The method comprises the steps of receiving elastic wave measurements from one or more sensors, as a train passes, releasing energy as guided waves into the rail; and of determining a function representative of the impulse response of the rail and the sensors. Developments describe how to determine the existence, position and characterisation of a defect in the rail
(Continued)

(e.g. fracture, incipient fracture, etc.), the use of inter-correlation analyses, correlation of the coda of correlations, Passive Inverse Filter, imaging techniques. Other aspects are described for exploring rail defects: sensor position and movement, acquisition time, sampling frequency, frequency filters, amplifications, techniques for learning during successive train passes, signal injection by transducers. Software aspects are described.

19 Claims, 5 Drawing Sheets

(51) Int. Cl.
　　*G01N 29/04*　　(2006.01)
　　*G01N 29/11*　　(2006.01)
　　*G01N 29/44*　　(2006.01)
(52) U.S. Cl.
　　CPC ......... *G01N 29/11* (2013.01); *G01N 29/4463* (2013.01); *G01N 2291/103* (2013.01); *G01N 2291/2623* (2013.01)

(56) References Cited

OTHER PUBLICATIONS

Scalea, et al., "Passive Extraction of Dynamic Transfer Function From Arbitrary Ambient Excitations: Application to High-Speed Rail Inspection From Wheel-Generated Waves", ASME, Journal of Nondestructive Evaluation Diagnostics and Prognostics of Engineering Systems, vol. 1, Feb. 2018.

Druet, et al., "Passive guided wave tomography for Structural Health Monitoring", The Journal of the Acoustical Society of America, 2020.

Sadoudi, et al., "ZigBee Sensor Network Platform for Health Monitoring of Rails Using Ambient Noise Correlation", Journal of Electrical Engineering 5, pp. 143-150, 2017.

\* cited by examiner

FIG. 1

According to the state of the art

INSPECTION OF RAIL HEALTH

CROSS-REFERENCE TO RELATED APPLICATIONS

This application is a National Stage of International patent application PCT/EP2019/069777, filed on Jul. 23, 2019, which claims priority to foreign French patent application No. FR 1857202, filed on Aug. 1, 2018, the disclosures of which are incorporated by reference in their entirety.

FIELD OF THE INVENTION

The invention relates to the field of metrology and in particular that of the non-destructive inspection of the health of elongate structures, for example industrial structures.

BACKGROUND

Railway lines comprise rails, "one-dimensional" elongate structures which need to be inspected regularly to confirm their structural integrity (e.g. detection of faults, cracks, incipient fractures or clean fractures in the rails, for example).

Through their elongate form, the rails constitute a waveguide for the propagation of waves, notably of elastic waves. There are various approaches to detecting faults, in particular the so-called active inspection techniques (with injection of energy, i.e. of elastic waves, into the structures to be studied) by contrast with the so-called passive inspection techniques.

An elastic wave corresponds to a mechanical wave, that is to say to a phenomenon of propagation of a disturbance in an elastic medium, corresponding to a rail in our particular case, without transporting material. The disturbance is transmitted step by step and there is a transfer of energy without material being transported.

The active techniques (for inspection by guided waves) consist generally in generating waves in a waveguide, that is to say a rail corresponding to the structure to be studied, for example using piezoelectric transducers, then in measuring the properties of said waves (e.g. amplitude, frequency, etc.) using one or more sensors placed on the structure to be studied. Such waves are commonly called guided waves since they are propagated in a waveguide formed by the rail.

According to the terminology used in metrology, a sensor receives a wave, performs a measurement from this received wave and supplies a measurement signal as output. A "sensor" generally operates in reception mode and a "transducer" generally operates in reception mode and/or in transmission mode. From this point of view, a sensor is a specific kind of transducer.

The guided waves generated in the structure to be studied can be propagated over great distances, primarily in a rail. Since the guided waves are sensitive to faults, the measurements contain information concerning the "health", the state of the structure. The measurements performed allow faults of a wide variety to be detected. In some conditions, it is also possible to locate and quantify certain faults. One example of active method is notably described in the patent document U.S. Pat. No. 9,797,869.

The passive inspection techniques, also called passive methods, consist in measuring the propagation, in the structure to be studied, of "naturally" guided waves present in the structure (jet of air over an airplane wing, ambient noise, etc.). Generally, the passive methods offer advantages but also a few major drawbacks (or limitations). Generally, the passive methods are advantageous compared to the active methods in that they present fewer difficulties in terms of scaling for production, integration or mass operation (little or no energy input, etc.). One of the major technical problems associated with the passive methods is the fact that the source is not generally controlled. These passive methods therefore demand sophisticated signal processing tools for interpreting the measurements performed passively.

In the railway case, during a maintenance inspection, a spot inspection or a routine inspection, the state of a rail is assessed upon the passage of a maintenance car (at low speed), which generates elastic waves, measured by sensors embedded on the car itself. These elastic waves can comprise acoustic components (so-called acousto-elastic waves).

The reference techniques for detecting faults in rails consist in using ultrasound waves (at high frequency, e.g. greater than 1 MHz), and not guided waves, using sensors embedded on a maintenance vehicle. Two main limitations follow: the inspection speed (of the order of 40 km/h) and the incomplete checking of the section of the rail (a part of the head and of the web only).

The article entitled "*Passive Extraction of Dynamic Transfer Function From Arbitrary Ambient Excitations: Application to High-Speed Rail Inspection From Wheel-Generated Waves*" (by F. L. di Scalea, X. Zhu, M. Capriotti, A. Y. Liang, S. Mariani and S. Sternini, *ASME J Non destructive Evaluation*, 2017) which falls within the framework of the passive approaches, describes the development and the implementation of a prototype of overhead sensors fixed to the front of a train and measuring the guided waves in the rail. During the movement of the train, the sensors measure the waves in the rails, allowing the zone between sensors (a few tens of centimeters) to be checked, making it possible to scan almost all of the running surface over the entire length of the rails over which the train passes. This method presents limitations.

Other examples of passive methods are described in the doctoral thesis entitled "*Passive guided wave tomography for Structural Health Monitoring Applications*" (Druet, T, Université de Valenciennes et du Hainaut-Cambresis, 2017). However, the subject of elongate structures is not broached therein.

Some approaches specific to rails are described in the doctoral thesis entitled "Etude et développement d'une plateforme de communication pour les réseaux de capteurs acoustiques sans fil: application au contrôle-santé des rails par corrélation du bruit ambient" (Study and development of a communication platform for wireless acoustic sensor networks: application to inspecting the health of rails by ambient noise correlation) (Sadoudi L, Université de Valenciennes et du Hainaut-Cambresis, 2016). The systems described present limitations.

There is a need for advanced methods and systems for detecting anomalies in elongate structures, and in particular for efficient and reliable methods that allow very large distances to be inspected (e.g. several hundreds or thousands of kilometers for the rail networks) and with reasonable costs.

SUMMARY OF THE INVENTION

The invention relates to methods and systems for inspecting a rail by guided waves, the rail being instrumented by sensors. The method comprises the steps of receiving measurements of elastic waves from one or more sensors, upon the passage of a train releasing energy in the form of guided waves into the rail; and in determining a function representative of the impulse response of the rail and of the sensors. Developments describe how to determine the existence, the position and the characterization of a fault in the rail (e.g. break, incipient break, etc.), the use of analyses by intercorrelation, correlation of the coda of correlations, passive inverse filter, imaging techniques. Other aspects are described for exploring rail faults: position and movement of sensors, duration of acquisition, sampling frequency, frequency filters, amplifications, learning techniques upon passages of successive trains, injection of signals by transducers. Software aspects are described.

In one embodiment, the method therefore comprises steps of inspection by guided waves in passive mode on an instrumented line.

In fact, the embodiments of the invention describe systems and methods for detecting faults, incipient breaks or clean breaks in an elongate structure, e.g. a rail. The inspection by guided waves is, here, passive, i.e. uses the noise generated by the passage of trains themselves and/or of maintenance vehicles (during the operation of the line), which noise is picked up, measured and analyzed by sensors positioned on the railway line.

Advantageously, the passage of trains on the rails is used opportunistically to assess the structural health of the rails. The methods and systems according to the invention exploit the waves generated by the passage of a train on the rails (wheel-rail contact). In other words, the invention can avoid the active generation or excitation of guided waves, generally involving a significant energy consumption.

In some embodiments, the passive mode according to the invention can coexist with active implementations. For example, the passive analysis can allow for a rapid and rough location of the faults, which can subsequently be analyzed more finely with an active device.

Generally, the invention is advantageous for all the industries using rails or cables over long distances (e.g. fairground structures, cable networks, port installations, etc.). Specifically, the invention is particularly advantageous in the railroad sector (trains, metros, tramways, etc.).

Advantageously, the embodiments according to the invention allow: any generation of waves via the use of dedicated transducers to be avoided (therefore leading to a significant reduction of the necessary energy), for the use of sensors that do not have the faculty to generate elastic waves, for example Bragg grating sensors in optical fibers; for the benefit of much greater inspection distances in passive mode than in active mode (the uncontrolled passive sources are potentially much more energetic, e.g. case of the TGV, than the active sources, a priori allowing greater distances to be checked, and lead also to a reduction in the number of sensors needed to check a unit of length).

BRIEF DESCRIPTION OF THE DRAWINGS

Other features and advantages of the invention will become apparent from the following description and the figures of the attached drawings in which.

DETAILED DESCRIPTION OF THE INVENTION

A method is described for inspecting a rail (by guided waves), said rail being instrumented by at least one sensor receiving waves being propagated in the rail upon the passage of a train or of a vehicle rolling on the rail, the method comprising the steps of: receiving measurement signals from said at least one sensor, upon the passage of a train or of a vehicle rolling on the rail; from the measured signal or signals, determining a function representative of the impulse response of the rail (or of the impulse response of the "rail-sensors" system, i.e., advantageously, of the assembly formed by the rail and the at least one sensor).

The impulse response of the rail describes the propagation of the waves in the rail. It corresponds advantageously to the Green function (of a medium or of a structure or of a space) which denotes the solution of a linear differential equation (or the partial derivatives) with constant coefficients and describes the propagation of the waves in this space (Feynman "propagator" terminology). The Green function of a given structure can only be approximated, i.e. by one or more functions representative of the Green function.

In other words, the impulse response of the rail is unique. The functions representative of this impulse response are plural. A function representative of the impulse response corresponds to a certain extent to a partial view of this impulse response (schematically, to a spectral windowing of the impulse response and/or a convolution of the impulse response with the response of a sensor).

In one embodiment, the method comprises the step of determining the existence of one or more faults in the rail from said function representative of the impulse response of the rail.

The term "fault" denotes a deviation with respect to a normal or nominal situation. A fault can be an "anomaly" or an "abnormal value" or an "extreme value" or a "degradation" or "damage". A fault can be, in railroad terms: an incipient break, such as corrosion or cracking, and/or a clean break. A fault can be determined by the application of predefined thresholds (or threshold ranges).

In one embodiment, the method comprises the step of determining the position of one or more faults in the rail (for example from the function representative of the impulse response of the rail).

In one embodiment, the method comprises the step of characterizing one or more faults, notably in terms of nature, of size, of orientation in space or of geometry, by analysis of amplitude and/or of frequency and/or by analysis of the form of the signal and/or by analysis of the frequency spectrum of the measurement signals and/or of the function representative of the impulse response of the rail and/or by identification of a change of mode of propagation of at least one of the waves being propagated in the rail.

Faults

In one embodiment, the method comprises the step of characterizing one or more faults, notably in terms of nature, of size, of orientation in space or of geometry.

A fault can notably be oriented horizontally, or vertically. Based on the analysis of the signals, the position and the size can be estimated. By learning or by comparison with charts drawn from mathematical or numerical models, a quantitative characterization can allow a type of fault (corrosion, crack, discontinuity, etc.) to be determined.

The characterization of a fault can be done in different ways, depending on the configurations. Characterization can be understood to mean that the nature of the fault (e.g. incipient crack, clean break, corrosion, etc.) is determined, and/or that its size and/or its orientation is determined (e.g. "mean" orientation because the faults are rarely straight) and/or that its geometry is determined (achievable in the case of a very large number of sensors).

In one embodiment, the characterization of a fault is done by differentiated diagnosis between the received signal being transmitted via the head of the rail and that being transmitted via the web of the rail. For example, if the signal is transmitted to one end of the rail and not the other, it is possible to approximately determine the extent of the fault and its position in the section of the rail. In the case where no signal is transmitted, it is possible that the break in the rail is virtually complete.

In one embodiment, alongside methods based on the intercorrelation of the pairs of signals, other analysis and post-processing methods can be applied, notably methods based on the correlation of the signals, a method based on a passive inverse filter (FIP) or a step of C-3 type.

Analysis of Form

In one embodiment, the characterization of a fault is done by analysis of the form of the signal, which can inform as to the geometry of the fault.

Amplitude/Frequency Analysis

In one embodiment, the characterization of a fault is done by analysis of the frequency spectrum of the measured signal (e.g. some frequencies can be more reflected by the fault than others; in this case, comparisons with simulated data are advantageous).

Self-Correlation and Intercorrelation

In one embodiment, the step of determining a function representative of the impulse response of the rail is performed by self-correlation or intercorrelation.

In one embodiment, the step of determining a function representative of the impulse response of the rail and advantageously of the assembly formed by the rail and two remote sensors is performed from the calculation of the intercorrelation $C_{AB}$ of the elastic wave noise signals $u_A$ and $u_B$ in the rail measured simultaneously at each sensor, that is to say at A and at B:

$$C_{AB}(t) = \int u_A(\tau) u_B(t+\tau) d\tau$$

in which t is the time.

When the measured noise is sufficiently long, it is stated that the intercorrelation converges toward a function representative of the impulse response (or Green function) of the rail, preferably of the assembly formed by the rail and the sensors A and B. It is this function which will be analyzed to determine the presence or absence of faults in the rail. It is comparable to the signal that would be obtained in active mode if a wave had been emitted at A and properties characteristic of this wave had been measured at B (or vice versa).

In the case where the two points A and B mentioned above are merged and where a single sensor is used, a self-correlation is performed instead of an intercorrelation. The function representative of the impulse response obtained is then comparable to the signal that could be obtained in active mode in pulse-echo mode (transmission/reception of signals performed via one and the same transducer).

In one embodiment, the characterization of a fault is done by analysis of the amplitude of the signal reflected (in pulse-echo configuration) and/or transmitted (in transmission configuration). A greater fault will reflect more energy, and will transmit less thereof. By combining the pulse-echo technique and transmission mode analysis, the diagnosis is refined (in theory, the sum of the energy transmitted and reflected is constant but there can be energy trapped at the fault, and all the more so when the fault is slanted).

In one embodiment, the rail is instrumented by at least two sensors remote from one another and receiving waves being propagated in the rail upon the passage of a train or of a vehicle rolling on the rail, the method comprising the steps of: receiving measurement signals from said at least two sensors, upon the passage of a train or of a vehicle rolling on the rail; determining a function representative of an impulse response of the rail, advantageously of the assembly formed by the rail and the at least two sensors, by performing an intercorrelation calculation between the measured signals.

Guided Modes

Beyond the detection of a clean break, the invention aims to detect incipient breaks. In a successive arrangement of four sensors (in active or passive mode), after emission in both directions in space (right and left) by a sensor C2, if a sensor C1 receives a signal, that indicates that C2 is operating well. If C3 does not receive a signal, that means that either C3 has failed, or that there is a break between C2 and C3. The sensor C4 then allows one or other of the hypotheses to be confirmed. The determination of the position of a fault constitutes the first step before the quantification or characterization of said fault.

In one embodiment, a guided mode is selected (which concentrates the maximum energy in the zone of the incipient fault). Indeed, at a given frequency, there are several guided modes which can be propagated in a rail. At the working frequencies (generally ~40 kHz), there are at least twenty or so guided modes. Some modes are better captured by certain sensor locations (e.g. web versus under the head).

Conversion of Guided Modes

In one embodiment, the characterization of a fault is done by conversion of guided modes. A fault can transfer energy in the web to the head, or vice versa, if it is sufficiently great, and generate a conversion of the mode of the wave being propagated in the rail. In other words, a fault can transfer a wave being propagated according to a first mode into a wave being propagated according to a second mode. It is therefore possible in practice to vary the positions of the sensors (for example between head and web to analyze these mode conversions). In one embodiment, a mode conversion is identified by the fact of having N (~20 minimum) sensors regularly spaced apart (approximately every 20 cm) and of post-processing the signals using a two-dimensional (in space and in time) Fourier transform. Moreover, time-frequency methods allow mode conversions to be identified using a single sensor (e.g. reallocated spectrograms, reallocated scalograms, the "Hilbert-Huang Transform" technique or even the "SyncroSqueezing Transform" technique).

In one embodiment, the step of determining a function representative of the impulse response of the rail is performed—by correlation of the coda of correlations between sensors, and/or—by a passive inverse filter step, such signal processing methods being described hereinbelow.

Correlation of the Coda of Correlations

In one embodiment, the step of determining a function representative of the impulse response between the sensors is performed by correlation of the coda of correlations between sensors, and/or by a passive inverse filter step. The coda of an ultrasound signal is the end of the signal. It consists of the multiple reflections and scatterings of the waves within the structure, as opposed to the start of the signal consisting of the waves being propagated along direct paths, which are said to be "ballistic".

In one embodiment, the post-processing comprises a "correlation of the coda of correlations" (C-3) between sensors. This development is entirely optional. The "correlation of the coda of correlations" consists, for a pair of measurement points A and B, corresponding to two sensors, for which the impulse response is sought to be determined, in choosing an additional measurement point C (situated neither at A nor at B); in correlating the measurements for each of the points A and B with this any measurement point C; in correlating the coda of these correlations to obtain the correlation between the measurement points A and B. The transition through the additional point C increases the complexity of the calculation operations, but, in certain situations, allows for a better convergence (i.e. provides a cleaner and therefore more usable signal) toward the impulse response between A and B than the direct calculation. The impulse response of the assembly formed by the rail and the two sensors positioned at the measurement points A and B is called the impulse response between A and B.

Passive Inverse Filter

A passive inverse filter determines the functions representative of the Green function, that is to say of the impulse response of the rail from the measurement of the noise (diffuse elastic field).

The method of analyzing the diffuse elastic field by passive inverse filter in fact allows the signal to be stepped up, i.e. the least energy (possibly) present in each direction of space to be recovered and exploited. Consequently, the physical arrangement of the sensors is less critical than in the case of an analysis by correlation. At the limits and in practice, the positions of the sensors can no longer depend on the sources of noise (ambient or artificial).

In one embodiment, the arrangement (topography/topology) of the sensors can be made subject to imaging steps (e.g. mapping, tomography).

In one embodiment, the step of determining, by passive inverse filter, a function representative of the impulse response of the structure to be analyzed comprises the steps of (i) subdividing, for example temporally, the signals measured on all the sensors, that is to say the data measured as a function of time, into a plurality of subvectors or pseudo-sources and (ii) breaking down monochromatic propagation matrices into singular values.

In one embodiment, the singular values which are obtained can be partitioned into two groups, a first group of values representative of the physical information of interest and a second group of values (which can subsequently be set to zero). Different methods allow the thresholding value to be determined (in particular according to rates of decay of the singular values when they are ordered).

In one embodiment, the step of determining, by passive inverse filter, a function representative of the impulse response of the structure to be analyzed comprises the steps of a) subdividing the temporal signal measured into a plurality of subvectors or pseudo-sources; b) breaking down monochromatic propagation matrices determined from the pseudo-sources in the frequency domain into singular values; c) obtaining a function representative of the impulse response in the time domain by inverse Fourier transform.

In one embodiment, the step of determining, by passive inverse filter, functions representative of the impulse response of the structure for each of the pairs of sensors interrogated comprises the steps of:—receiving the diffuse elastic field measurement signals from N physical sensors (for example FBG for "Fiber Bragg Grating" and/or PZT for "Piezoelectric" and/or EMAT for "Electro-Magnetic Acoustic Transducer"), substantially simultaneously, the diffuse elastic field not necessarily observing an energy equipartition condition, said measurements determining a plurality of temporal vectors; —dividing said temporal vectors into a plurality of subvectors or pseudo-sources; —for each of the pseudo-sources, performing a Fourier transform to frequency w; —for each frequency w: 1) determining the monochromatic propagation matrix H(w) linking the pseudo-sources to the measurement points; 2) determining a plurality of singular values by breaking down each matrix H(w) into singular values; 3) ordering and thresholding said singular values in a first group of values representative of the physical information of interest and a second group of values set to zero; 4) determining N^2 functions representative of the impulse response of the structure (one for each of the pairs of real physical sensors); —determining N^2 temporal functions representative of the impulse response of the structure by concatenating the inverse Fourier transforms of the N^2 functions representative of the impulse response calculated in the frequency domain.

The subvectors can be called "pseudo-sources".

Variations of the Positions of the Sensors

In one embodiment, the method further comprises the step of characterizing one or more faults, by varying one or more positions of the sensors and/or by selecting sensors from among a plurality, for example during different iterations of the determination step, each determination step being performed on the basis of the measurement signals from the selected sensors.

These variations of positions can be obtained in various ways, physical and/or logical. In one embodiment, the real positions of the sensors can be physically adjusted. In one embodiment, a selection from among a plurality of sensors can be performed. For example, if a portion of line has been instrumented by a large number of sensors, it is possible to proceed with the selection of a subset of sensors, possibly in a way that changes over time, in order to explore or probe the line.

Imaging

In one embodiment, the method comprises the step of determining one or more images comprising a mapping of the propagation of the elastic waves in the structure, the images being determined by one or more imaging methods selected from among a tomography imaging method, an echography imaging method, a total focusing imaging method, an aperture synthesis imaging method, a spatial filtering imaging method, or a high-resolution imaging method.

In one embodiment, the measurements are received simultaneously by the sensors and/or are synchronized. The synchronization can be due to the use of a unique acquisition device. The synchronization can be performed a posteriori (signals "resynchronized", or "postsynchronized").

In one embodiment, the train or vehicle rolling on the rail is associated with one or more internal parameters comprising a type of train, a type of wheel, an axle weight and/or a rolling speed; wherein, in the reception step, the method comprises the step of acquiring measurement signals as a function of one or more external parameters comprising a first instant relating to the start of the measurements, a second instant relating to the end of the measurements, a duration of the measurements, and/or a sampling frequency; and wherein the method further comprises a step of modifying or adjusting one or more of the external parameters as a function of one or more internal parameters.

In one embodiment, a fault is determined by application of predefined thresholds, said predefined thresholds being determined by reference to a real state, for example with respect to a state of the rail that is known to be healthy or with respect to a calibrated state of said rail, or by reference to a simulated state of the rail.

A mathematical model can in fact allow the wheel-rail contact and the loss of energy in the rail from the acousto-elastic energy to be modeled. This modeling subsequently allows different faults (sizes, positions, etc.) to be simulated and theoretical charts of what the sensors ought to measure to be constructed. The measurement data are not therefore limited to the real measurements but can be based at least partly on modelings.

In one embodiment, the predefined thresholds are determined by learning. The learning (supervised or not, by Deep Learning, by Support Vector Machines, by (Rotational) Random Forest, by Bayesienne logic, by neural networks, etc.) can be trained on real and/or calculated data.

In one embodiment, the method comprises the step of comparing the measurements determined from successive passages of trains on the rail (or comparing the functions representative of the impulse response of the rail determined during different determination steps performed upon successive passages of trains or vehicles on the rail).

The axle load/weight and the train speed have little influence on the results (a TGV or a maintenance vehicle allow for substantially the same use of the signals given constant perimeter). However, specifically, it may be advantageous to vary this perimeter as trains travel on the line, i.e. to modify the measurement parameters (external, specific to the measurement), the internal parameters (specific to the train) being imposed (usual case). For example, when a fault has been detected for a first time, it is possible to adjust the frequency filters.

In other words, given the repeated passages of trains in passive mode, it may be advantageous to change the acquisition parameters between each passage (e.g. filtering of the signals, durations or lengths of acquisition, sampling frequency, etc.) in order to interrogate the structure in different and complementary conditions. Since each train also has its own characteristics (e.g. weight, number of axles, etc.), the successive adjustments can advantageously allow a frequency spectrum to be covered which is "complemented" as the passages proceed. Moreover, mention has been made of the machine learning steps that can be implemented.

In one embodiment, the method comprises the step of emitting an alert to the driver and/or to the traffic regulation system and/or a step of emitting a braking command (said steps being, for example, triggered as a function of the result of the step of determination of the existence of one or more faults).

A system is described for inspecting a rail by guided waves, comprising:—a rail instrumented by a plurality of sensors, said sensors being associated with the rail, and being configured to measure and communicate measurements of acousto-elastic waves upon the passage of a train or of a vehicle rolling on the rail; computation and/or memory resources configured to determine a function representative of the impulse response between the sensors and/or the existence and/or the position and/or the characterization of a fault in the rail.

In one embodiment, the sensors are chosen from among piezoelectric transducers and/or optical fiber Bragg grating sensors, and/or magneto-acoustic transducers of EMAT type.

In one embodiment, one/each sensor is chosen from among piezoelectric transducers and/or optical fiber Bragg grating sensors, and/or magneto-acoustic transducers of EMAT type and/or magnetostrictive transducers.

Other sensors can be used, notably one or more impulse lasers (fiber or not), one or more CMUT (for "Capacitive Micromachined Ultrasonic Transducers"), one or more PMUT (for "Piezoelectric Micromachined Ultrasonic Transducers"), MEMS accelerometers, PVDFs, etc.

It should be noted that depositions of thin piezoelectric layers on the rail can be advantageous, above all in passive mode.

In one embodiment, a sensor is a removable sensor. The association can be mechanical and/or chemical and/or electromagnetic, permanent or temporary. The placement of the sensors on the section of the rail and/or along the rail can be modified or adjusted by drone and/or by robot and/or by a maintenance vehicle.

In one embodiment, one sensor or several sensors are fixed under the head of the rail and/or on the web of the rail. Depending on the configurations, the "inner" and/or "outer" walls of the web or of the head can be used.

The association can be mechanical and/or chemical and/or electromechanical, permanent or temporary. The placement of the sensors on the section of the rail and/or along the rail can be modified or adjusted by drone and/or by robot and/or by a maintenance vehicle.

According to other embodiments, the positioning of the sensors can be optimized according to the profile of the rail considered. A tram rail for example is generally asymmetrical and certain placements may be more advantageous than others.

The configuration generally implemented for the detection of a break or of a rail comprises a plurality of sensors C1-On. In active mode, the waves are emitted equally to the right and to the left. Likewise, in passive mode, the sensors are equally sensitive to the waves coming from the right and from the left. To detect incipient cracks and be as sensitive as possible, it is advantageous to work not in transmission mode between two sensors but in "pulse-echo" mode (the same sensor is used as emitter and as receiver). A possible fault will be detected because it will reflect a small portion of the wave to the receiver which will detect this echo. The drawback with this arrangement is that there will be no determination as to whether the echo comes from a fault to the right or to the left. To remedy this, it is advantageous to place two sensors side-by-side, in pairs. This arrangement is advantageous but remains optional.

It is then possible, by adjusting the phase-shifts between the sensors placed side-by-side in emission (and/or in reception), to control the emission (respectively the reception) preferentially alternately to the right or to the left. The phase-shift is calculated to create interferences that are constructive of the emitted (and/or received) wave to one side and destructive to the other side. This option makes it possible to choose on which side to emit the wave and/or to identify whether a given echo comes from the right or from the left and thus eliminate the ambiguity of the configuration in which just one sensor is used.

According to embodiments of the invention, up to four sensors can be placed at the same "measurement point": two sensors can be placed under the head while two sensors will be placed on the web, so as to be able to differentiate downstream the response between web and head, and thus reinforce the analysis as to the presence of incipient faults.

In one embodiment, a communicating sensor is powered by the vibratory energy from the trains rolling on the rail. A sensor can be protected by a technical protective measure. A sensor can comprise a standalone energy supply, such as a solar energy supply and/or vibratory energy supply and/or wind energy supply (in a tunnel).

In one embodiment, the system further comprises one or more elastodynamic noise sources such as piezoelectric transducers configured to actively complement the passive inspection by guided waves.

Active and/or Passive Modes

It should be noted that the embodiments described do not exclude active approaches, quite the opposite. The fact of having permanent sensors (passive mode) makes it possible to make use of a multitude of measurements with the same acquisition system which allows the analyses and the diagnosis to be reinforced.

The active/passive combination or sequence allows for deeper and complementary investigations. The passive solution can be more energy economical (since there is no ultrasound energy injected into the structure by the system).

In one embodiment, the system according to the invention comprises at least one transducer configured to trigger and/or actively complement the passive inspection by guided waves.

In one embodiment, the rail being instrumented by at least one transducer, the method comprises, following the step of determination of the impulse response, the steps of—generating waves in the rail from the transducer; —measuring at least one quantity characteristic of said waves using the at least one sensor, and—determining the existence of one or more faults in the rail from said function representative of the impulse response of the rail and/or from said at least one characteristic quantity.

In one embodiment, the impulse response of the rail is the impulse response of the assembly formed by the rail and said at least one sensor.

According to one embodiment of the invention, a system for inspecting a rail can operate nominally in passive mode, only upon passages of trains for example, and, in the event of the suspicion of a fault in the signals (deviation or deviations with respect to predefined thresholds or ranges of thresholds), the method can include more in-depth analysis in active mode by better controlling the conditions of generation of the waves (e.g. use of an optimal excitation spectrum, for example not linked to the vibratory spectrum of the train, use of a plurality of frequencies, mobilization of multiple ultrasound shots to save on signal-to-noise ratio, etc.). This activation of the active mode can be very rapid and performed on demand, since it is independent of the passage of vehicles. In other words, the method according to the invention in passive mode can be used as trigger for a system in active mode. The active mode can also be triggered systematically after each passage of a train, or in a scheduled manner in a period without the passage of a train, or even at the request of an operator.

A system is described for inspecting a rail, comprising:—a rail instrumented by at least one sensor, said sensor being associated with the rail, and being configured to acquire measurement signals of quantities characteristic of waves being propagated in the rail upon the passage of a train or of a vehicle rolling on the rail; —computation and/or memory resources configured to determine a function representative of the impulse response of the rail from the measurement signal or signals.

In one embodiment, the system further comprises one or more GNSS circuits associated with one or more sensors so as to time-stamp the signals measured by said sensor points.

Each sensor can be associated with its own GNSS module. As described previously, there are solutions for pooling the costly electronics. The measurements from the sensors can also be synchronized by other means, if only some of the sensors benefit from GNSS time-stamping.

In one embodiment, the sensors are arranged in a centralized, or decentralized, or distributed manner. The sensors can in fact be arranged in different ways (centralized, peer-to-peer, hybrid, etc.). The sensors can exchange data (for synchronization and/or transmission of the signals). The calculations can be local and/or performed remotely (Cloud, pooled elements or nodes).

Figure 1:
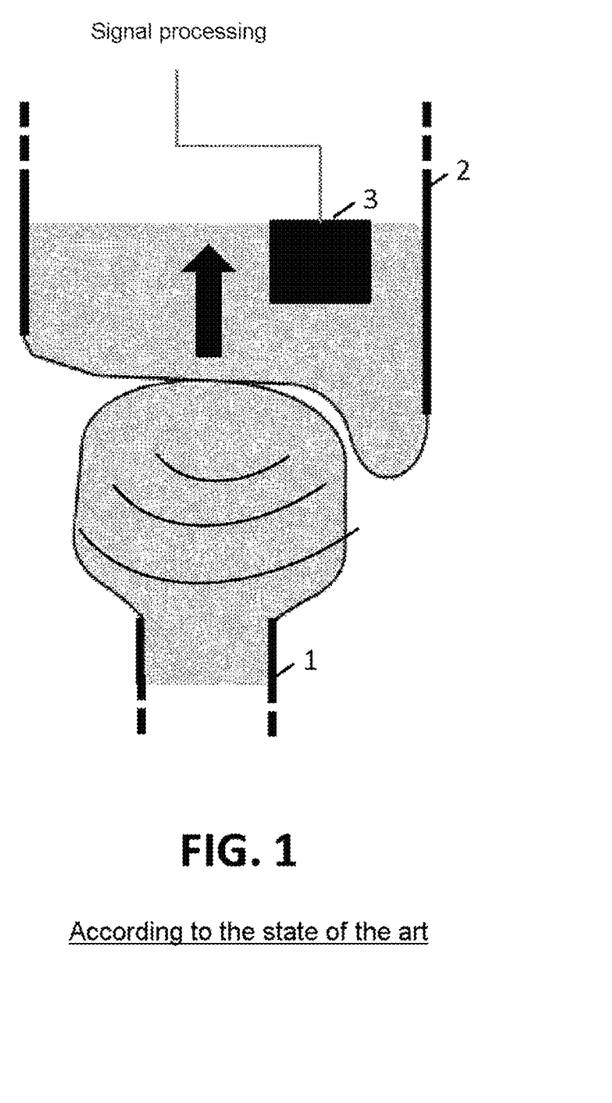
FIG. 1 schematically illustrates a system according to the state of the art for inspecting a rail.

FIG. 1 illustrates a solution known from the state of the art, i.e. without instrumentation of the railway line.

The rail 1 transmits guided waves caused by the passage of a wheel 2, which waves are measured by one or more contactless sensors 3. The sensors of contactless type are generally fixed to the rolling car itself, on a system fixed to the front of the train. This device measures the waves only on the rolling part of the rail, i.e. the top part of the rail ("head"), and not in the entire section of the rail, which constitutes a significant limitation.

The contactless sensors 2 are also generally costly and often fragile.

Moreover, the fact that the sensor or sensors are linked to the train means that the faults are detected only upon the passage of the train. Now, for issues of cost, such inspections are not very frequent. If a clean break is detected, it is generally too late. The cases of use are generally limited to maintenance operations performed at low speeds, so that it is not possible to envisage having such a device on the commercial trains, and therefore benefiting from frequent inspection.

Figure 2:
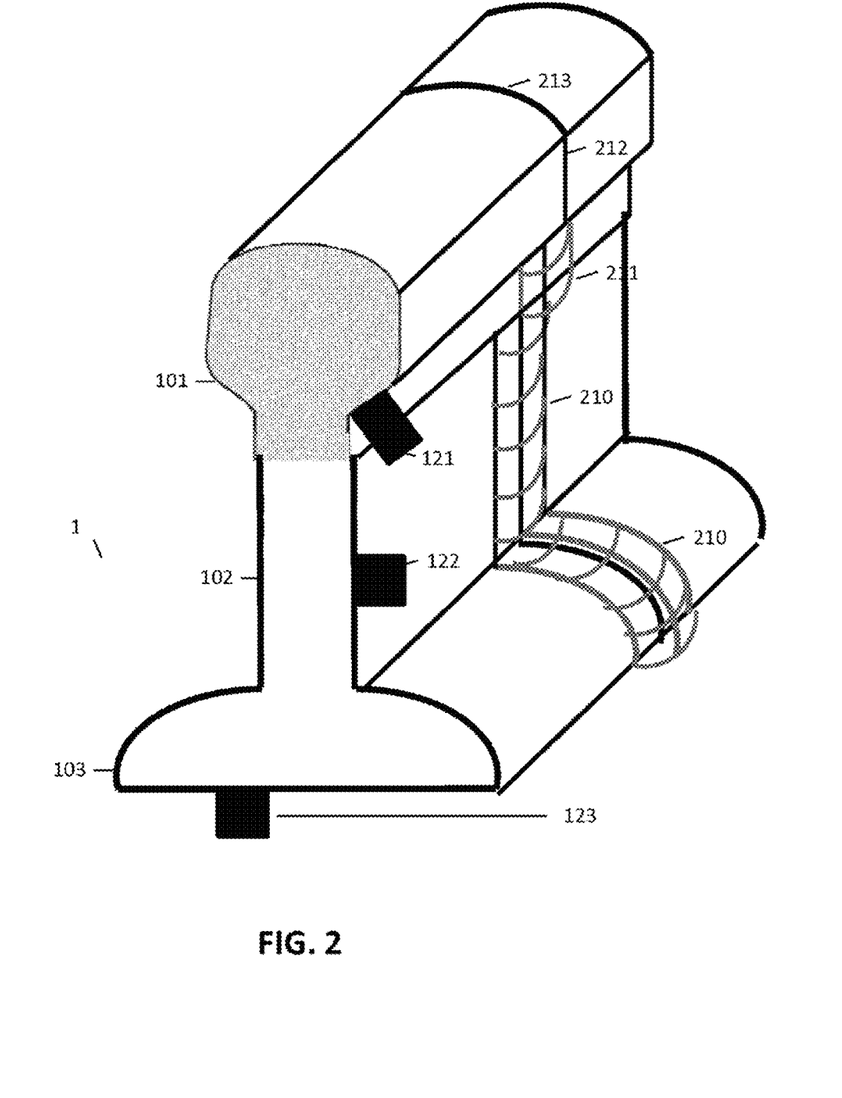
FIG. 2 is a partial schematic representation of a rail inspection system according to the invention, said inspection system comprising a plurality of sensors equipping a rail.

FIG. 2 illustrates an embodiment of the invention with a rail instrumented by one or more sensors (121, 122, 123).

FIG. 2 shows a rail 1, whose constant section comprises a number of sub-parts: the "head" 101, the "web" 102 of the rail, and the "flange" 103. The sensors, of different kinds, can be variously distributed (121, 123) along the line or the rail.

A sensor can be placed at different points in, on, under or in proximity to the rail. For example, a sensor 121 can be embedded in the mass of the head of the rail. A sensor 122 can be glued onto one or other wall or face of the web of the rail (inner or outer). A sensor 123 can be placed between the rail and the ballast (bed of stones or gravel). The advantageous positions of the sensors are described hereinbelow.

A railway line is composed of two rails. In practice, and a priori, the two rails can be considered to be independent (the transverse effects via the ballast or the ties are negligible or can be filtered). Likewise, trains crossing in the reverse direction has a negligible effect on the structure of a single rail.

This aspect of structural independence in the railway case is not prejudicial for example to safety policies which can consider both rails. For example, a fault on one rail at a certain position can urge investigation of the other rail, at the same level. In fact, faults on one or other of the two rails of one and the same line can involve causes and/or effects which are not independent.

The embodiments of the invention described in this document relate to "one" rail, but are obviously applicable to both rails of one and the same line, simultaneously or not, or to any type of rail (rail guide, etc.). The invention is not limited to one or two rails; in some systems, there can be 1, 2, 3 or more rails.

The present invention is distinguished from the solution illustrated in FIG. 1 by many differences. The passive in situ instrumentation according to the invention is highly advantageous by comparison to the state of the art, notably in terms of range (fault location distance), perimeter (all the parts of the section of the rail), accuracy (fine granularity of the faults detected), energy and inspection frequency.

The wastage of the energy injected by the rolling train into the rails is essentially a function of the discontinuities of the rail (welds between rails, presence of splice bars, switching systems, etc.). Without these discontinuities, the theory would assume that the weakening of the signal is very low given that the metal of the rail is an elongate solid of constant section.

The "depth of view" is in fact much better according to the invention. Because of the great quantity of energy released by the passage of a vehicle rolling on the rails and the quality of the signals handled, a fault can be detected at a few kilometers from the current position of the vehicle, allowing, for example, for an emergency braking (for a TGV train, the stopping distances in normal operation are of the order of a few kilometers). In other words, the arrangement according to the invention can allow anomalies to be detected at several kilometers from the train, which can allow for an emergency braking, or an adaptation of the speed or a reconfiguration of the traffic.

Moreover, each point of the rail can be analyzed twice: once upstream of the passage of the train, and once downstream thereof.

Perimeter

The (a) quantity of energy and (b) the frequency richness of the noise caused by a train rolling in nominal operation (a fortiori by a TGV) is such that, via appropriate acquisition times, it is possible to fully probe the structure. According to the invention, the measurements of the propagated waves are performed in all the parts of the section of the rail (101, 102, 103) and therefore allow cracks or other faults to be detected in almost the entire section of the rail.

Accuracy

With due allowance for the instrumentation, the acquisition times and the rolling conditions (axle weight, speed), experimental tests suggest that the locating of faults located in any part of the section of the rail, with centimetric, even millimetric accuracy and at several kilometers, is achievable. In degraded or constrained conditions, the rapid locating of a clean break is possible at several kilometers.

Energy

The proposed approaches are therefore advantageous in terms of energy. In other words, the quantity of energy injected into the rail is significantly greater than that injected in the case of an inspection in active mode.

In the railway case, since the wheel-rail contact generates a great quantity of mechanical energy and, in particular, elastodynamic energy (e.g. vibrations, shocks, etc.), the passive method allows for greater distances to be checked than the active method, and this is so for the same number of sensors used. The mechanical energy can also be "static" (in as much as it can relate to stresses or prestresses accumulated in the rails, which can be released suddenly, even violently).

Moreover, a major advantage of the invention stems from the regular passage of the trains on the line. Advantageously, all the trains traveling on a given line, what is more of variable gauge templates (e.g. axle weight, speed of the train), contribute to the "continuous" exploration of the state of the lines. The state of the lines can thus be updated and explored in various ways.

In a specific embodiment, in place of or complementing the normal traffic on the line, a specifically rigged vehicle can inspect the lines (e.g. very significant axle weight, use of specific percussion or vibratory systems to specifically inject resonance frequencies or frequencies of interest).

Excitation systems can also be installed permanently and/or removably along the line.

Inspection Frequency

Contrary to the state of the art of FIG. 1 which requires the passage of a train specifically instrumented for inspection and limited in speed, the present invention potentially exploits the passage of all the trains on the line, thus allowing for several inspections per day.

Positions of the Sensors

The maximum propagation distance does not take account only of the dissipation within the material (which is low in the case of solids) but above all takes account of the geometrical disturbances of the guide. In the flange 103, the fixings to the ties limit the propagation to a maximum of a few meters. In the web 102, it is the welds 210 between two successive rails which will reflect a small portion of the wave on each passage (the rails are welded to one another approximately every 18 m to 36 m). This is generally due to the local variation of section of the waveguide because of the weld bead. On the head 101, the weld bead is generally trimmed (212, 213), except under the head (211). Under the head, the reflection on passing the weld 211 is very limited, which makes it possible to consider propagations over very long distances (position of the sensor according to 121, under the head and without hindering the crossing by the wheels of the traveling vehicles). Alternatively, or in addition, a sensor can be placed according to 122 i.e. on the web of the rail (inner or outer wall).

Figure 3:
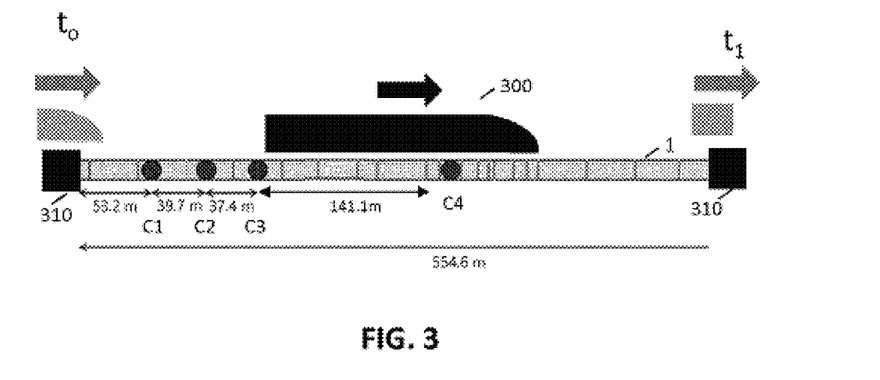
FIG. 3 is a partial schematic representation of a rail inspection system according to the invention, said system comprising a plurality of sensors distributed along a rail on which a rail vehicle travels.

FIG. 3 illustrates the passage of a train on an example of instrumented line according to the invention.

The train 300 travels (wheel not represented) on a rail 1 which comprises a plurality of sensors, denoted C1, C2, C3 and C4 (their number Cn is unlimited, there can be one sensor every kilometer, or even tens, hundreds or even thousands of micro-sensors per meter). The rail segments are fixed to one another 310 by splice bars and/or by welds. A railway splice bar is a metal part used to connect two consecutive rails of a railway line. The splice bars are affixed in pairs, on either side of the rail, using bolts or other fastening pieces.

Nature of the Sensors

According to the embodiments, the sensors can be of different types. In the example which is illustrated, for the detection of a clean break, piezoelectric sensors are coupled.

According to the embodiments, the following can be used (possibly in combination): piezoelectric sensors, optical fibers with Bragg grating or even magneto-acoustic sensors.

The sensors can be of different sizes, from the macroscopic scale to devices of MEMS type, even nano-machines.

The sensors that can be used by the methods according to the invention are currently significantly less costly than the contactless sensors.

The instrumentation of the railway lines, or of parts thereof, becomes economically viable (and/or will develop favorably in the future).

Distribution of the Sensors (e.g. Spacing)

In the example which is illustrated, the sensors are spaced apart by several tens of meters.

In some embodiments, several sensors are positioned in, under, on or in proximity to the rail (of the different subsections).

In one embodiment, one or more sensors are natively incorporated in each rail segment.

In one embodiment, the placement of the sensors on the section of the rail or of the structure can be modified, thus allowing other parts of the section of the rail to be checked.

In one embodiment, the spacing between sensors can be modified (from a few tens or hundreds of meters, even a kilometer for the railway case). The density of sensors can be locally adjusted (switches can mobilize a lot of sensors, compared to long straight lines that are less likely to have to endure strong mechanical stresses and/or be damaged).

Coupling

In an advantageous embodiment, the sensors are fixed to or in contact with the structure of the rail. This arrangement generally produces signals of very good quality from the frequency point of view and in terms of amplitude of the signals. The quality of signal to be processed is generally of better quality than the contactless sensors.

However, in some embodiments, it is possible to use contactless sensors. The lesser signal quality can in fact be offset by post-processing and/or longer acquisition times.

In one embodiment, the sensors are coupled to the rail permanently (or irreversibly). In practice, the fixing or the association can be mechanical and/or chemical and/or electromagnetic. The sensors can for example be held by clamps (passing under the rail in the ballast), for example, so as not to hamper the operation of the line. Other attachment methods comprise associations by glue, by welding, by magnetism or electro-magnet, by spring, by power cylinder, etc.

In some embodiments, the sensors are removable (the coupling or the association is temporary or reversible). In fact, the instrumentation can change. In one embodiment, one or more sensors are placed or moved by robots or drones or maintenance vehicles. In one embodiment, the sensors comprise autonomous movement means and are moved alone (either on command, or by virtue of an embedded logic system). The locations on the rail or the section of the rail can be continually optimized (e.g. fleet of drones, local movement, etc.). In one embodiment, one or more sensors are connected and/or autonomous (e.g. movement by MEMS, peer-to-peer distributed logic, autonomous groups of independent drones, etc.).

In one embodiment, one or more sensors are protected (e.g. against weather, malicious attack, etc.) by technical protection measures (e.g. gratings, keys, alarms, concealment, etc.).

Figure 4:
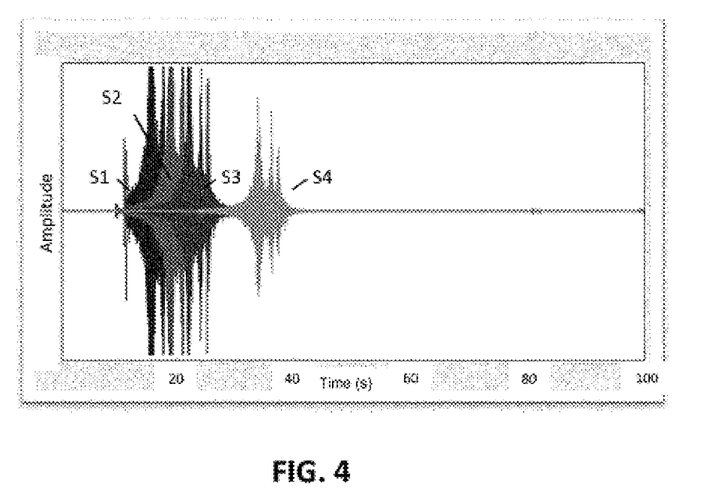
FIG. 4 is a graphic representation of the amplitude as a function of time of four signals recorded, during the execution of a rail inspection method according to the invention, by the sensors represented in FIG. 3 upon the passage of the rail vehicle on the rail with which they are associated.

FIG. 4 illustrates an example of recording of the guided waves on the passage of a rolling vehicle. FIG. 4 represents, for example, the voltage signals obtained at the output of the sensors C1, C2, C3 and C4, respectively $S_1$, $S_2$, $S_3$ and $S_4$.

In the example, the signals are those received by the sensors C1, C2, C3 and C4 on the passage of a vehicle rolling at 45 km/h on the instrumented line.

The recording of the signals measured by the sensors is triggered simultaneously on all the sensors upon the approach of a rolling vehicle. The duration of acquisition ($t_0$, $t_1$) includes the approach of the vehicle, its passage over all the sensors, and extends until the vehicle is far from the sensors (for example, here, a hundred or so meters).

Synchronization

In the example illustrated in FIG. 3, the sensors are, for example, connected directly to an oscilloscope recording the electrical voltage at the terminals of the sensors. These signals represent the waves at the sensors as a function of the time. The use of a single measurement instrument advantageously guarantees the mutual synchronization of the measurements from the different sensors. The acquisition needs to be simultaneous and synchronized between at least two sensors.

In other embodiments, various synchronization or resynchronization means can be used. For example, measurement "hubs" or nodes can be defined and used for one or more given sensors, which are provided for example with wireless communication capabilities (3G, 4G, 5G, Wifi, Wimax, etc.), the synchronization of the signals being performed a posteriori.

Sampling Frequency

The sampling frequency can vary, for example as a function of the phenomena of interest. The higher the frequency (e.g. high frequency >1 MHz), the finer the measurements and the more they will relate to structural faults of small dimensions. Conversely, low frequencies (e.g. tens of kHz) will be associated with major faults.

Triggering of the start of the measurement can be performed at various instants, for example when the vehicle is at a great distance (>1 km), or if the vehicle is located above the sensor, or even if the vehicle has gone past the sensor.

The duration of the measurements (signal acquisition time) can be modified or made modifiable or configurable. Depending on the metrological chain, an acquisition time of a few seconds may be sufficient.

The post-processing of the signals measured by the sensors C1 to C4 (see FIGS. 3 and 4), for its part, can be extremely rapid (of the order of a few microseconds, depending on the computation power available).

In one embodiment, the post-processing consists in performing the intercorrelation between the elastic wave noise signals in the rail measured by two different sensors forming a pair of sensors. Under certain hypotheses, the result of this inter-correlation corresponds to a function representative of the impulse response of the assembly formed by the rail and the two sensors.

This analysis thus makes it possible to reconstruct signals (called "passive signals") that are equivalent to those which would have been emitted then received actively (one transducer at the position of one of the sensors emits and the other sensor receives) and thus draw conclusions on the state of the rail between the two sensors concerned. This passive method makes it possible to obtain the same information on the propagation of the waves in the medium of interest as provided by a more common active method.

Imaging

In one embodiment, the method further comprises a rail imaging step. This step is entirely optional. As input, signals measured by a plurality of sensors and/or transducers are supplied; as output, an image of the structure (here the rail) is obtained. This image allows internal or surface faults to be viewed.

This imaging can be obtained in different ways, used, alone or in combination, notably by TFM, SAFT, MUSIC, Excitelet, MVDR and RAPID methods. The acronyms are specified and described hereinbelow.

The total focusing imaging technique (TFM standing for "Total Focusing Method") consists in proceeding with the acquisition of the complete series of signals linking all the emitting/receiving elements and in coherently aggregating the signals at all points of the zone imaged.

The imaging technique can be done by aperture synthesis (SAFT, the acronym for "Synthetic aperture focusing technique"). This technique allows an image to be obtained which is easy to interpret, by including the influence of the transducers, their coupling and the elimination of the image noise.

The multiple signal classification imaging technique (MUSIC, the acronym for "MUltiple Signal Classification") is a high-resolution method which relies notably on parametric signal models (e.g. particular properties of the covariance matrix of the signal, allowing the space of the data to be separated into two subspaces, the signal space generated by the sinusoids, and the noise space which is its orthogonal complement). In particular, the MUSIC method is based on the noise space.

In the "Excitelet" imaging technique, the residual signal is correlated with the signals in a library, called atoms, corresponding to the residual signals calculated with a propagation model which comprises several modes and takes account of the dispersive effect of the material and the electromechanical impedance of the transducers.

The Capon spatial filtering imaging technique ("Minimum variance distortionless response", with the acronym MVDR) is also a spatial filtering variant.

Reconstruction algorithms for the probabilistic inspection of damage (acronym RAPID) can be used. This type of mapping is based on the statistical analysis of the differences of certain characteristics of the signals measured in a reference state (without fault) and in the current state (potentially damaged).

It should be noted that the imaging step can retroact (e.g. condition or control) the steps of the method according to the invention (e.g. operation of the sensors, manipulation of internal or external parameters so as to more finely explore the rail).

Figure 5:
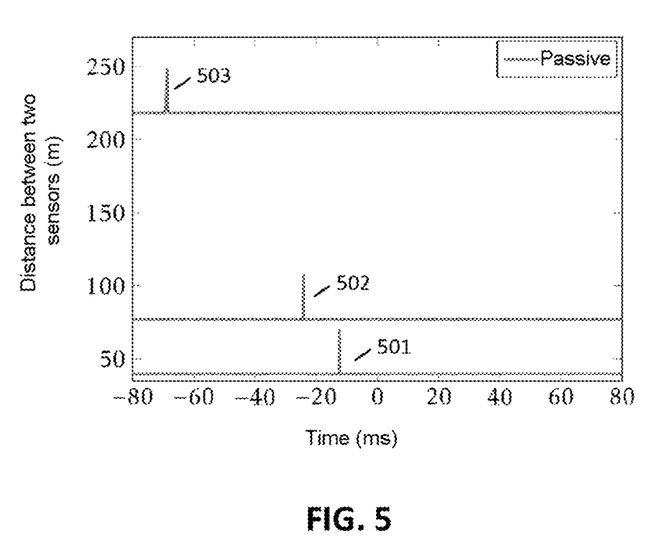
FIG. 5 is a graphic schematic representation of signals reconstructed from an intercorrelation calculation of the signals represented in FIG. 4, a first reconstructed signal being obtained from the signals measured by the sensors C1 and C2 of FIG. 3, a second reconstructed signal being obtained from the signals measured by the sensors C1 and C3, and a third reconstructed signal being obtained from the signals measured by the sensors C1 and C4.

FIG. 5 illustrates an example of analysis and of processing of the signals recorded by the sensors C1 to C4.

For three pairs of sensors positioned according to FIG. 3 (C1-C2, C1-C3 and C1-C4), the noise signals measured simultaneously (see FIG. 4) are then post-processed to determine therefrom a function representative of the impulse response.

FIG. 5 thus presents examples of signals reconstructed from an intercorrelation calculation between the sensors C1 and C2 (501), C1 and C3 (502), and C1 and C4 (503). Three temporal signals are obtained that are ordered according to the distance between the sensors concerned. On each of the signals, a peak or "Dirac point" is visible, which represents the wave being propagated from one sensor to the other. This is the same wave which would be obtained in active mode if an emitter had been placed at C1 and three receivers at C2, C3 and C4.

The negative abscissa is linked to the direction of movement of the train (from left to right), and if the path had been followed in the reverse direction, the peaks would have appeared for positive times.

It is thus easy to see that the time of flight of the wave increases with the propagation distance (which confirms the convergence of the calculation toward a function representative of the impulse response). Thus, the presence of these Diracs indicates that a wave has succeeded in being propagated in the rail between C1 and C2 (respectively C1 and C3 and C1 and C4), and therefore that there is no break in the rail between all these sensors.

The intercorrelation $C_{12}$ of the signals $S_1$ and $S_2$ measured by the sensors $C_1$ and $C_2$ is for example obtained by performing the following calculation:

$$C_{12}(t)=\int S_1(\tau)S_2(t+\tau)d\tau.$$

The respective amplitudes and forms of the signals 501, 502 and 503 (here normalized) can be compared with the theoretical amplitudes of the propagation of the waves in the rail (or with standard measurements with constant perimeter, e.g. type of rail, speed, weight, or even between the different segments of rails crossed by the train concerned) in order to refine the diagnosis in the case of presence of a fault.

Figure 6:
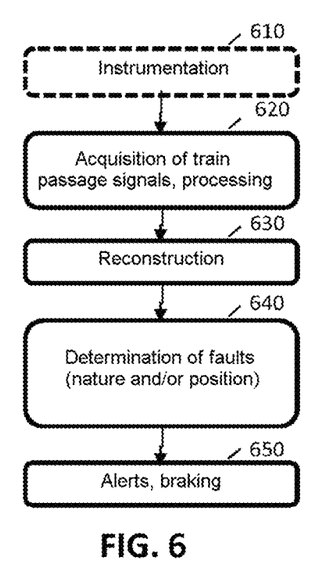
FIG. 6 illustrates examples of steps of the rail inspection method according to the invention.

FIG. 6 illustrates examples of steps of the method according to the invention, notably of determination of a fault and of decision-taking.

In the step 610, a railway line is instrumented over all or part of its path, with sensors whose type and distribution (e.g. spacings, positions on or in the section of the rail, etc.) can vary. This step can be done once or a number of times, prior to the implementation of the method according to the invention. In one embodiment, the instrumentation changes over time (but not during the measurements).

In the step 620, signals measured by the sensors are received, and possibly synchronized if they have not already been synchronized. Different means for synchronizing measurements on one and the same clock can be used, between the different sensors or group of sensors. Alternatively or in addition, post-processing resources can allow signals measured on unsynchronized clocks to be resynchronized.

In the step 630, the synchronized signals are manipulated (post-processing, e.g. self-correlation or intercorrelation, C-3, or FIP) so as to determine the function representative of the impulse response of the rail, then the physical information is extracted therefrom in the step 640.

In the step 640, based on the results from the preceding step, one or more faults or anomalies may be determined, in various ways, notably by comparison of the function representative of the impulse response of the rail with existing theoretical models (e.g. mathematical representations) or existing empirical models (e.g. past measurements, charts, heuristics, etc.).

More generally, during the step 640, form analysis, amplitude/frequency analysis, guided mode conversion detection and imaging methods as described above are applied to a signal corresponding to the function representative of the impulse response obtained in the step 630.

In a particular embodiment, with a rail instrumented with two sensors positioned at points A and B, the signals reconstructed between A and B upon the passage of the train (in "passive" mode therefore) may reveal the absence of a peak at the time of flight corresponding to the propagation of the wave between A and B, which may mean a clean break of the rail between A and B. It is then possible to trigger a verification in "active" mode for example by the emission of a guided wave in the rail by a transducer C positioned in proximity to the sensor B (or by B directly if the latter is a transducer), to A. Diagnosis can be confirmed or invalidated (e.g. A or B failing). Multiple confirmations can be decided to control the braking of the train. The passive-active sequence can also be conducted in such a way as to explore, in frequency bands that are absent or insufficient in the signals reconstructed by passive means, the various suspected faults.

In one embodiment, one or more thresholds can be used, i.e. compared with the values measured and reconstructed. In one embodiment, the threshold or thresholds can be determined by measurements performed in a known (healthy) state of the rail (calibration, charts, etc.).

For example, if the amplitude of the reconstructed signal does not exceed a pre-established value, a fault or a break can be announced (message, alert) to the person and/or the machine.

Learning techniques can be implemented.

According to the embodiments, the mode of reaction to the detection of a fault can be in open loop mode (alert to the driver of the train) or in closed loop mode (emergency braking triggered automatically, for example as a function of the distance between the current position of the train and the location of the fault (if necessary).

In one embodiment, more sophisticated decision-making steps of the method can be implemented (centralization, decentralization, distribution, etc.).

Regarding the post-processing, computation capabilities (e.g. on the sensors) and/or storage capabilities can be local and/or remote ("Cloud computing").

In one embodiment, one or more sensors can be connected sensors (e.g. communication between the multiple groups of sensors and/or a central processing unit).

One or more logics can constitute the decision, or decision-assistance system. Optionally, advanced post-processing methods can allow for an interpretation of the measurements that goes beyond the simple detection of a clean break, for example for the detection of incipient breaks in the form of corrosion or cracking.

In one embodiment, a sensor is independent in energy terms (powered by solar and/or vibratory and/or wind energy, etc.).

Figure 7:
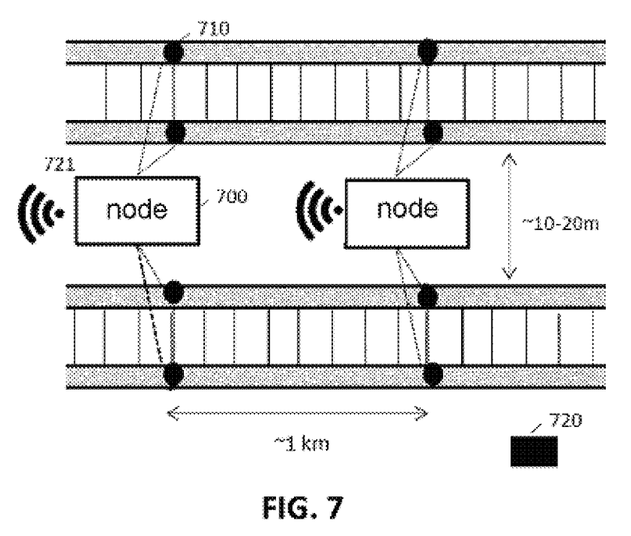
FIG. 7 is a schematic representation of a railway installation comprising two railway lines equipped with a rail inspection system according to the invention, said system comprising several groups of sensors equipping rails of the railway lines, each group of sensors being linked to a respective node for processing signals from the sensors.

FIG. 7 illustrates an embodiment of the invention.

In one embodiment, entirely optional, a "node" or "hub" 700 (pooling the electronic resources) can drive a number of physical sensors or "measurement points". Each measurement point 710 can comprise one or more sensors (of type 121 and/or 122). A node 700 can comprise communication resources 721 (wired or wireless, e.g. 4G, 5G, Wifi, Ethernet, optical fiber, etc.), so as to centralize the data in a processing center 720 (e.g. synchronization, alerts, etc.). The data can be captured and transmitted continuously, or even be recovered once per day, or on the fly upon the passage of a train, etc. In one embodiment, a node can have the facility to drive the sensors both in transmission mode and in active pulse-echo mode and in passive mode ("generic" node). In some embodiments, one or more nodes can be optimized in terms of functionalities and cost.

Figure 8:
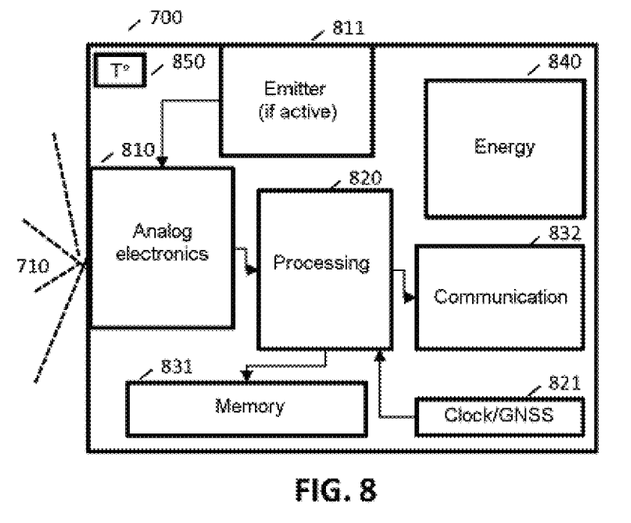
FIG. 8 illustrates an example of structure of one of the nodes of FIG. 7.

FIG. 8 illustrates an example of structure of a node for capturing signals according to the invention.

A node 700 according to the embodiments of the invention can comprise different components. A node can comprise an emitter in the active case. In passive mode, there is no emitter since the energy of the train is used. The signals from the sensors 710 are received by an electronic analog/digital circuit then processed by a circuit 820 (FPGA, CPU or the like) which communicates the data 832 and/or stores the data 831 locally. In one embodiment, a node can comprise a GNSS module (GNSS being the acronym for "Global Navigation Satellite System", e.g. GPS or Galileo or GLONASS or Beidou-2 (COMPASS)). This GNSS circuit is advantageous for marking the position of the node once it is positioned on the line, but also for dating the signals accurately (an accurate date-stamping to a few nanoseconds allows for synchronization in post-processing).

Regarding the energy source 840, different embodiments are described. In a passive approach, the data to be transmitted can be voluminous (typically a few megabytes Mb instead of a few bytes or hundreds of bytes in the active case). Depending on the communication protocols implemented, that can be a point to be taken into account.

In one embodiment, the node of sensors is autonomous and communicating. In one embodiment, the node harvests the vibratory energy using the piezoelectric sensors glued to the rail and/or the gust of air on the passage of a train (mini-wind, for example when the system is in a tunnel), and/or from a solar panel. In one embodiment, the node comprises a battery. In other embodiments, more transient energy storage systems are used (e.g. supercapacitors, through harvesting of energy upon the passage of a train, therefore over a very short time).

The invention can be implemented using hardware and/or software elements. It can be available as computer program product on a computer-readable medium. The medium can be electronic, magnetic, optical or electromagnetic. The computing means or resources can be centralized and/or distributed ("Cloud computing"), possibly with or based on peer-to-peer and/or virtualization and/or redundancy technologies. The software code can be executed on any appropriate processor (for example, a microprocessor) or processor core or a set of processors, whether provided in a single computation device or distributed between several computation devices. The computerized implementation of the invention can use centralized systems (e.g. client-server or master-slave) and/or distributed systems (e.g. architecture of peer-to-peer type using accessible computing resources, possibly opportunistically, e.g. ad hoc networks, etc.). The system (or its variants) implementing one or more of the steps of the method can use one or more dedicated electronic circuits or a general-purpose circuit. The method can also be implemented on a reprogrammable computation machine (a processor or a microcontroller for example) running a program comprising a sequence of instructions, or on a dedicated computation machine (for example a set of logic gates such as an FPGA or an ASIC, or any other hardware module). A dedicated circuit can notably improve performance. The reference to a computer program which, when run, performs any one of the functions described previously is not limited to an application program running on a single host computer. On the contrary, the terms computer program and software are used here in the general sense to refer to any type of computing code (for example application software, firmware, microcode, APIs, web services, or any other form of computer instruction) which can be used to program one or more processors to implement steps of the method.

The fact that the subheadings are underlined indicates simply that the features concerned are essential.

The invention claimed is:

1. A method for inspecting a rail, said rail being instrumented by at least one sensor receiving waves being propagated in the rail upon the passage of a train or of a vehicle rolling on the rail, the method comprising:
   receiving measurement signals from said at least one sensor, upon the passage of a train or of a vehicle rolling on the rail, said at least one sensor being fixed under the head of the rail and/or on the web of the rail;
from the measured signal or signals, determining a function representative of the impulse response of the rail.

2. The method as claimed in claim 1, further comprising the step of determining the existence of one or more faults in the rail from said function representative of the impulse response of the rail.

3. The method as claimed in claim 2, further comprising the step of determining the position of one or more faults in the rail from the function representative of the impulse response of the rail.

4. The method as claimed in claim 3, further comprising the step of characterizing one or more faults, notably in terms of nature, of size, of orientation in space or of geometry, by analysis of amplitude and/or of frequency and/or by analysis of the form of the signal and/or by analysis of the frequency spectrum of the measurement signals and/or of the function representative of the impulse response of the rail and/or by identification of a change of mode of propagation of at least one of the waves being propagated in the rail.

5. The method as claimed in claim 3, further comprising the step of characterizing one or more faults, by varying one or more positions of the sensors and/or by selecting sensors from among a plurality, during different iterations of the determination step, each determination step being performed on the basis of the measurement signals from the selected sensors.

6. The method as claimed in claim 1, wherein the step of determining a function representative of the impulse response of the rail is performed by self-correlation or intercorrelation between the measured signals.

7. The method as claimed in claim 1, the step of determining a function representative of the impulse response of the rail being performed by:
   correlation of the coda of correlations between sensors; and/or
   a passive inverse filter step, said step comprising the steps of: a) temporally subdividing the temporal signal measured into a plurality of subvectors or pseudo-sources; b) breaking down monochromatic propagation matrices determined from the pseudo-sources in the frequency domain into singular values; c) obtaining the function representative of the impulse response in the time domain by inverse Fourier transform.

8. The method as claimed in claim 1, wherein the measurements are performed simultaneously by the sensor or sensors and/or are synchronized.

9. The method as claimed in claim 1, wherein:
   the train or the vehicle rolling on the rail is associated with one or more internal parameters comprising a type of train, a type of wheel, an axle weight and/or a rolling speed;
   in the reception step, the method comprises the step of acquiring measurement signals as a function of one or more external parameters comprising a first instant relating to the start of the measurements, a second instant relating to the end of the measurements, a duration of the measurements, and/or a sampling frequency;
and wherein the method further comprises a step of modifying or adjusting one or more of the external parameters as a function of one or more internal parameters.

10. The method as claimed in claim 2, wherein a fault is determined by application of predefined thresholds, said predefined thresholds being determined by reference to a real state, for example with respect to a state of the rail that is known to be healthy or with respect to a calibrated state of said rail, or by reference to a simulated state of the rail.

11. The method as claimed in claim 1, the rail being instrumented by at least two sensors remote from one another and receiving waves being propagated in the rail upon the passage of a train or of a vehicle rolling on the rail, the method comprising the steps of:
   receiving measurement signals from said at least two sensors, upon the passage of a train or of a vehicle rolling on the rail; and
determining a function representative of an impulse response of the rail, advantageously of the assembly formed by the rail and the at least two sensors, by performing an intercorrelation calculation between the measured signals.

12. The method as claimed in claim 1, comprising a step of comparing the functions representative of the impulse response of the rail determined during different determination steps performed upon successive passages of trains or vehicles on the rail.

13. The method as claimed in claim 2, further comprising a step of emitting an alert to the driver and/or to the traffic regulation system and/or a step of emitting a braking command, said steps being triggered as a function of the result of the step of determination of the existence of one or more faults.

14. The method as claimed in claim 1, wherein the rail is instrumented by at least one transducer, the method comprising, after the step of determination of the impulse response, the following steps:
   generating waves in the rail from the transducer;
   measuring at least one quantity characteristic of said waves using the at least one sensor;
   determining the existence of one or more faults in the rail from said function representative of the impulse response of the rail and/or from said at least one characteristic quantity.

15. The method as claimed in claim 1, the impulse response of the rail being the impulse response of the assembly formed by the rail and said at least one sensor.

16. A computer program product, said computer program comprising code instructions allowing the steps of the method as claimed in claim 1 to be performed, when said program is run on a computer.

17. A system for inspecting a rail, comprising:
   a rail instrumented by at least one sensor, said at least one sensor being fixed under the head of the rail and/or on the web of the rail, and being configured to acquire measurement signals of quantities characteristic of waves being propagated in the rail upon the passage of a train or of a vehicle rolling on the rail;
   computation and/or memory resources configured to determine a function representative of the impulse response of the rail from the measurement signal or signals.

18. The system as claimed in claim 17, each sensor being chosen from among piezoelectric transducers and/or optical fiber Bragg grating sensors, and/or magneto-acoustic transducers of EMAT type and/or magnetostrictive transducers.

19. The system as claimed in claim 17, further comprising one or more GNSS circuits associated with one or more sensors so as to time-stamp the signals measured by said sensor points.

* * * * *